US010669133B2

(12) United States Patent
Le Vern et al.

(10) Patent No.: US 10,669,133 B2
(45) Date of Patent: Jun. 2, 2020

(54) DEVICE PROVIDING SAFE ACCESS TO A CONFINED SPACE, NOTABLY A LATERAL-ACCESS CONFINED SPACE

(71) Applicant: TOTAL RAFFINAGE CHIMIE, Courbevoie (FR)

(72) Inventors: Nicolas Le Vern, Carry le Rouet (FR); Olivier Gervais, Miramas (FR)

(73) Assignee: Total Raffinage Chimie, Courbevoie (FR)

( * ) Notice: Subject to any disclaimer, the term of this patent is extended or adjusted under 35 U.S.C. 154(b) by 0 days.

(21) Appl. No.: 16/317,121

(22) PCT Filed: Jul. 10, 2017

(86) PCT No.: PCT/EP2017/067198
§ 371 (c)(1),
(2) Date: Jan. 11, 2019

(87) PCT Pub. No.: WO2018/011109
PCT Pub. Date: Jan. 18, 2018

(65) Prior Publication Data

US 2019/0241409 A1 Aug. 8, 2019

(30) Foreign Application Priority Data

Jul. 11, 2016 (FR) ...................................... 16 56616

(51) Int. Cl.
*B66C 23/20* (2006.01)
*A62B 1/04* (2006.01)
(Continued)

(52) U.S. Cl.
CPC .............. *B66C 23/208* (2013.01); *A62B 1/04* (2013.01); *A62B 1/06* (2013.01); *B66D 3/06* (2013.01); *B66D 2700/026* (2013.01)

(58) Field of Classification Search
CPC ........... B66C 23/208; A62B 1/04; A62B 1/06; B66D 3/06; B66D 2700/026
See application file for complete search history.

(56) References Cited

U.S. PATENT DOCUMENTS 2,513,403 A * 7/1950 Dakin ................... B66C 23/208 212/179
2,686,600 A * 8/1954 Smith ................... B66C 23/205 212/223
4,589,523 A * 5/1986 Olson ................ A62B 35/0093 182/234

(Continued)

FOREIGN PATENT DOCUMENTS

| | | | | |
|---|---|---|---|---|
| FR | 2267124 A1 | * | 11/1975 | ............... A62B 1/06 |
| GB | 918346 A | * | 2/1963 | ............... B66D 3/04 |
| JP | 10279288 A | * | 10/1998 | ................ F16L 1/06 |

OTHER PUBLICATIONS

International Search Report issued in Application No. PCT/EP2017/067198, dated Aug. 31, 2017, 5 pages.

*Primary Examiner* — Michael E Gallion
(74) *Attorney, Agent, or Firm* — Albert Shung

(57) ABSTRACT

The invention relates to a device (10) for safe access to a confined space, comprising:
a rectilinear support strut (12),
two arms (14, 16) each fixed rigidly to an end (12*a*) of the strut, at right angles thereto and in opposite directions.
A first arm (14) comprises at least one anchoring element (18), the second arm (16) being provided with at least two pulleys (20, 22) whose axis of rotation is at right angles to the plane defined by the strut and the arms. The anchoring element (18) and the two pulleys (20, 22) are arranged so as to allow the passage of a cordage of the anchoring element to the pulleys without interfering with the strut and the first and second arms. The strut (12) has at least one fixing member intended to cooperate with an opening (84) of the confined space in order to ensure the fixing thereof.

8 Claims, 4 Drawing Sheets

(51) Int. Cl.
*A62B 1/06* (2006.01)
*B66D 3/06* (2006.01)

(56) References Cited

U.S. PATENT DOCUMENTS

| | | | | | |
|---|---|---|---|---|---|
| 5,101,935 | A * | 4/1992 | LaBianca | A62B 1/06 182/142 |
| 5,431,248 | A | 7/1995 | Willaughby | |
| 5,617,963 | A * | 4/1997 | Baziuk | B66C 23/208 212/179 |
| 5,791,858 | A * | 8/1998 | Sasser | A22B 5/161 414/462 |
| 6,135,300 | A * | 10/2000 | Fox | B66C 23/208 182/60 |
| 6,152,675 | A * | 11/2000 | Compton | B60P 1/5495 212/299 |
| 6,412,736 | B1 * | 7/2002 | Zaragoza | A63B 67/10 212/179 |
| 6,705,821 | B2 * | 3/2004 | Philipps | B60P 1/5471 212/180 |
| 6,830,423 | B1 * | 12/2004 | Williams | B60P 1/5471 212/180 |
| 7,213,715 | B2 * | 5/2007 | Boily | A62B 1/08 212/179 |
| 7,845,622 | B1 * | 12/2010 | Riggs | B66C 23/44 212/180 |
| 7,913,980 | B1 * | 3/2011 | Cipriano | B66D 3/08 248/218.4 |
| 9,073,734 | B1 * | 7/2015 | Cates | B66C 23/203 |
| 9,161,526 | B2 * | 10/2015 | Nipper | A01M 31/02 |
| D750,865 | S * | 3/2016 | Iceton | D34/33 |
| 9,802,800 | B2 * | 10/2017 | Kalakay, Jr. | B66D 3/26 |
| 2008/0085669 | A1 * | 4/2008 | Burrows | A22B 5/06 452/187 |
| 2009/0095944 | A1 * | 4/2009 | Gaines | B66C 23/005 254/334 |
| 2017/0247236 | A1 * | 8/2017 | Svoboda | A62B 35/0068 |
| 2018/0057334 | A1 * | 3/2018 | Poczciwinski | B66F 19/005 |

* cited by examiner

DEVICE PROVIDING SAFE ACCESS TO A CONFINED SPACE, NOTABLY A LATERAL-ACCESS CONFINED SPACE

CROSS-REFERENCE TO RELATED APPLICATIONS

This application claims the benefit of PCT/EP2017/067198 filed Jul. 10, 2017, which claims priority from FR 1656616 filed Jul. 11, 2016, which are incorporated herein by reference in their entireties for all purposes.

The invention relates to a device for safe access to a confined space, in particular a confined space with lateral access, and an enclosure equipped with such an access device.

A confined space can be defined as a totally or partially closed volume (building, structure, equipment item, installation, etc.) which has not been designed and constructed to be occupied permanently by people, or intended to be so, but which, on occasion, may be temporarily occupied to perform operations therein of servicing, maintenance, cleaning, occasionally and more or less frequently, or unscheduled operations following exceptional events. The atmosphere within a confined space may also present risks for the health and safety of the people who enter therein because of the design or the location of the structure, an insufficiency of natural ventilation, materials, substances or fluids that it contains or which are used therein, equipment items which are implemented therein or even the nature of the works which are carried out therein.

The confined spaces are thus present in many business sectors, particularly in the petrochemical industry, especially in the refining industry.

The intervention of personnel in such confined spaces requires protection measures to reduce the risks of accidents and emergency intervention measures to be put in place. There are thus access devices intended to allow an injured person to be removed from the confined space, via an opening formed in a horizontal or lateral wall, generally called manhole. The document U.S. Pat. No. 5,431,248 describes an access device of this type comprising two or four telescopic bearing arms. The document U.S. Pat. No. 5,617,963 describes an access device fixed to the lip of a lateral opening by clamping jaws.

When the access to the confined space can be obtained only through an opening on a lateral wall extending vertically, evacuation devices resting on the ground or on a platform can be used.

There are also devices that can be fixed without tools onto the edge of a lateral opening. The device DBI-SALA® thus proposes a device having a support fixed without tools onto the lip of the lateral opening to which is fixed an articulated rotary arm of which one end can be positioned inside the confined space to support a man. The pivoting arm inserted into the confined space extends at a distance from the walls: it is then difficult to introduce tools or the like via the manhole. Furthermore, the installation time is relatively lengthy and this device cannot support more than one person at a time and its weight is still high, greater than 50 kg, making it difficult to transport.

There is therefore a need for a device for safe access to a confined space, in particular via a manhole, which is easy to transport, which can be mounted rapidly and which allows two people to be supported.

The invention aims to overcome these drawbacks by proposing a device for safe access to a confined space, comprising:

- a rectilinear support strut,
- a first arm fixed rigidly to an end of the strut and extending at right angles to said strut,
- a second arm fixed rigidly to another end of the strut and extending at right angles to said strut, in a same plane as the plane defined by the first arm and the strut but in a direction opposite to said first arm, and in which:

- the first arm comprises at least one anchoring element situated at a predetermined distance from the strut,
- the second arm is provided with at least two pulleys whose axis of rotation is at right angles to the plane defined by the strut and the first and second arms, one pulley being situated at an end of the second arm fixed to the strut and another pulley being situated at a predetermined distance from the strut, the anchoring element and said at least two pulleys being arranged so as to allow the passage of a cordage of the anchoring element to the pulleys without interfering with the strut and the first and second arms,
- the strut has at least one fixing member intended to cooperate with an opening of the confined space.

The proposed access device can thus be fixed to a manhole, more specifically to an outer lip of the manhole, via the fixing member or members: a fixing can thus be easily and rapidly produced, in just a few minutes.

The device according to the invention is also relatively non-bulky so that it can easily be transported. It also comprises a few parts, it is consequently relatively light and simple to produce. Finally, since the various parts are fixed rigidly to one another (without possible movement relative to one another), the device according to the invention offers the advantage of being robust and of allowing two men to be supported.

The fixing member or members can in particular be configured to be able to be fixed onto elements of the opening that allow it to be blocked. Generally, a manhole has, on its perimeter, a lip pierced with orifices making it possible to fix a closure plate thereto. The fixing member or members are advantageously configured to be fixed to this lip, preferably via the orifices thereof, for example via removable fixing elements of screw-nut or pin type.

Generally, the fixing member or members can extend on the side of the second arm, notably in immediate proximity thereto. The fixing member or members can be arranged so as to position the second arm bearing against an inner surface of the opening when they cooperate therewith.

Advantageously, the strut can comprise at least two fixing members, in particular fixed rigidly to the strut, extending in a plane at right angles to the plane defined by the strut and the first and second arms, on either side of the strut. This can improve the securing of the access device.

As a variant, one or two fixing members can be provided that are fixed removably to the strut and that define with the latter, or with another fixing member fixed rigidly to the strut, a clamp. This clamp can be configured to be tightened onto an outer lip of a manhole, for example via removable fixing elements of screw-nut or pin type.

Generally, said at least one fixing member can define an orifice of axis parallel to the second arm. This orifice can have an elongate, or oblong form, extending for example in the direction of the strut, or even an elongate and curved form, the inward curvature of which is directed toward the end of the strut secured to the second arm. These forms make it possible to facilitate the alignment with another orifice existing around the manhole.

In order to further facilitate the handling and the transportation of the access device according to the invention, the strut can be formed in two parts whose ends are joined and secured by removable fixing elements. It is thus possible to dismantle the access device in order to transport it, even to first fix to the manhole the part comprising the fixing members, then to secure the other part of the access device to the part already fixed and possibly to the manhole.

This joining can be done very simply. Any joining of male/female parts can thus be envisaged, provided that the two parts of the strut can be secured to one another in order to form a rectilinear strut.

For example, a first joined end can define a U-shaped housing whose concavity is open in a direction opposite to the second arm and a second joined end can be received inside the housing, bearing against surfaces internal to the housing.

Advantageously, the second joined end can then comprise a pierced fixing tab cooperating with an orifice formed in a bottom wall of the U-shaped housing of the first end, a removable fixing element joining the fixing tab to the bottom wall of the housing. This fixing element can take the form of a screw-nut set, for a robust fixing. The fixing tab can form part of the abovementioned fixing members. It can then participate in the fixing of the access device to the manhole via the fixing element.

The removable fixing elements used to secure the two joined parts of the strut can be chosen from a pin passing through corresponding orifices of the joined ends and a screw-nut set. The fixing elements can extend in right-angled directions for a better fixing. As an example, two parallel pins can be provided, arranged one above the other and extending at right angles to the plane defined by the strut and the arms. The screw-nut set can then extend parallel to the first and second arms.

In order to further reduce the weight of the access device according to the invention, the second arm can be an extrusion with H-shaped cross section. The first arm and the strut can also be hollowed closed extrusions.

Finally, the second arm can comprise at least one anchoring element situated at a predetermined distance from the strut, which can be used to fix safety elements (rope ladder, fall prevention device) or tools. This anchoring element can support one of the pulleys mentioned previously.

The access device according to the invention is intended to facilitate access to an enclosure defining a confined space, via a manhole present on a lateral wall of the enclosure. Generally, this type of enclosure is cylindrical, with a vertical axis of symmetry in use, although the latter can extend horizontally. In particular, the access device is intended to be arranged in such a way that the support strut extends vertically and the two arms extend horizontally, the second arm extending inside the confined space through the opening, in particular along an inner surface of this opening.

The invention thus relates also to an enclosure comprising a lateral wall provided with a manhole having, on its perimeter, an outer lip at a distance from the lateral wall, defining for example a surface, in particular planar, pierced with orifices, characterized in that it is provided with an access device according to the invention secured to said manhole, in which:

- the strut of the access device extends vertically or substantially vertically above the manhole, the first arm extending at right angles or substantially at right angles to the lateral wall of the enclosure and the second arm extending inside the manhole, bearing against a top inner surface of said manhole,
- at least one fixing member of the access device is bearing against the outer lip and secured thereto by removable fixing elements.

The fixing can thus be produced simply. Furthermore, the access device is pressed against the inner wall of the manhole so that it reduces only very little the access to the interior of the manhole: men and equipment can enter and exit while the access device is fixed.

The invention relates finally to a method for installing an access device according to the invention, on a manhole formed through a lateral wall of an enclosure, said manhole having, on its perimeter, an outer lip at a distance from the lateral wall, defining for example a surface, in particular planar, pierced with orifices. The installation method comprises the following steps:

- placing of the fixing members of the access device bearing against the outer lip, the strut extending vertically or substantially vertically above the manhole, the first arm extending at right angles or substantially at right angles to the lateral wall of the enclosure and the second arm extending inside the manhole, bearing against a top inner surface of said manhole,
- securing of at least one fixing member to the outer lip by removable fixing elements.

The invention is now described with reference to the nonlimiting attached drawings, in which.

In the present description, the terms top, bottom refer to the up and down directions, in the position of use of the access device in which the strut is substantially vertical, in other words substantially in the direction of gravity.

Substantially horizontal, longitudinal or vertical is understood to mean a direction/a plane forming an angle of at most ±20°, even at most 10° or at most 5° with a horizontal, longitudinal or vertical direction/plane.

Substantially parallel or at right angles is understood to mean a direction/a plane departing by at most ±20°, even at most 10° or at most 5° from a parallel or right-angled direction/plane.

Figure 1:
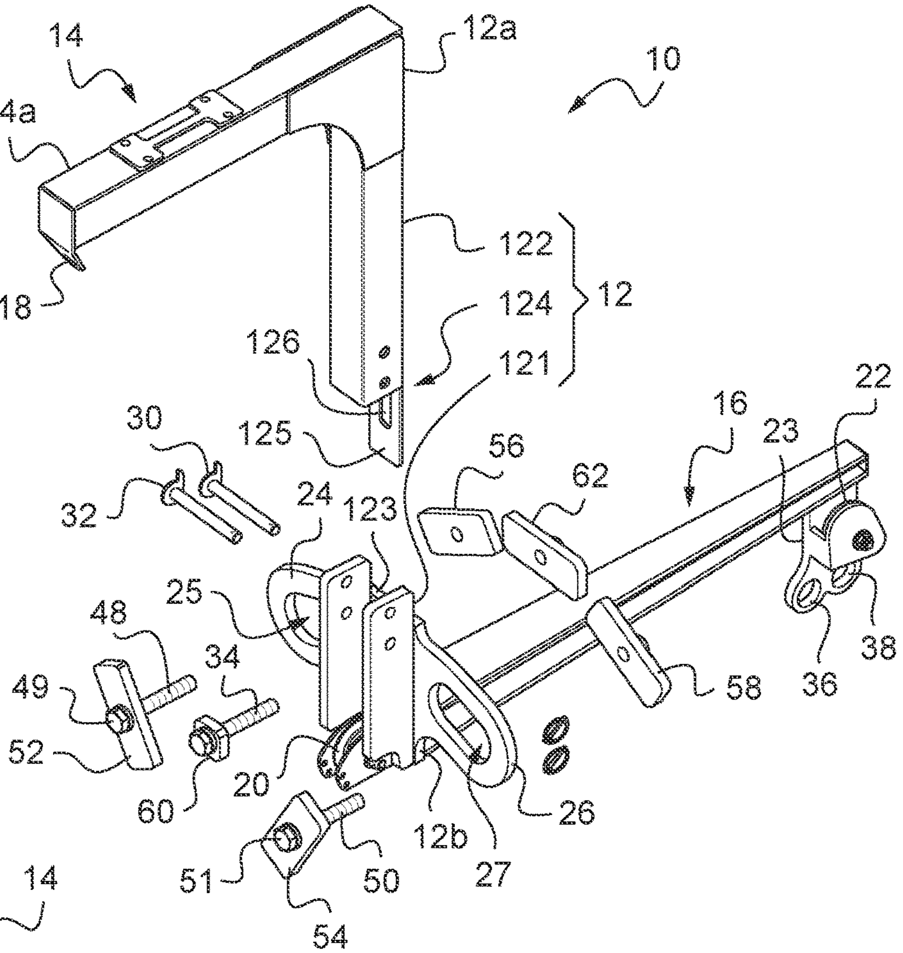
FIG. 1 represents an exploded perspective view of a device for safe access to a manhole according to an embodiment of the invention.
Figure 2:
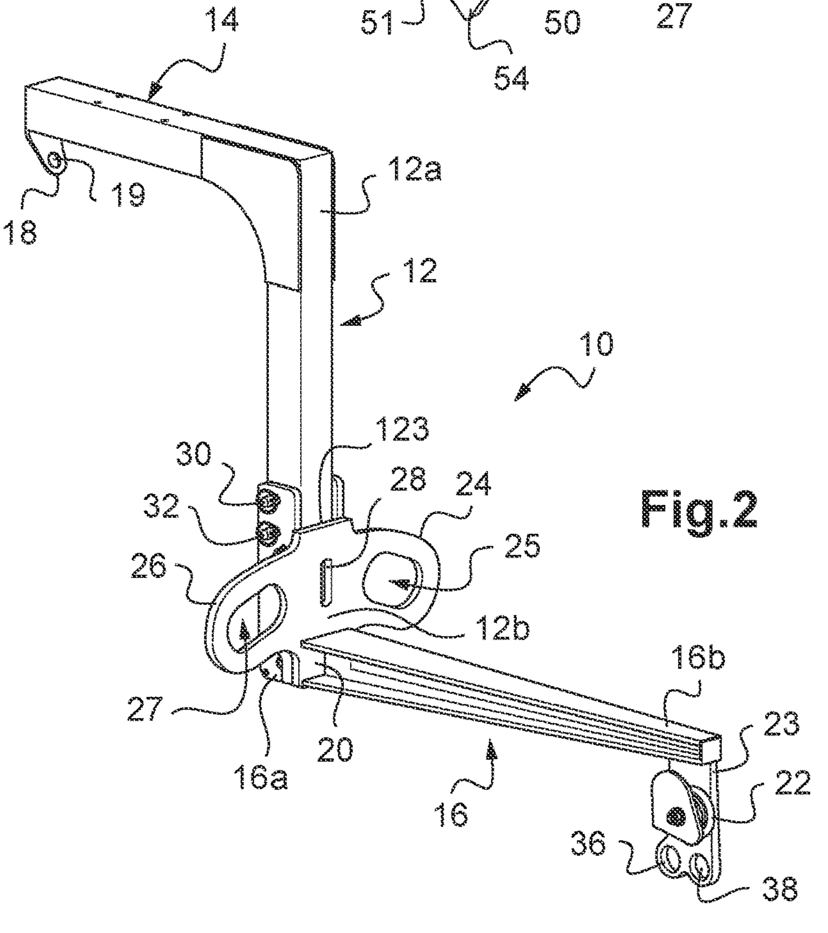
FIG. 2 represents a perspective view of the same access device, in the assembled state.

FIGS. 1 and 2 represent a safe stop device 10 comprising:

- a rectilinear support strut 12,
- a first arm 14 fixed rigidly to an end **12*a* of the strut 12, here a top end, and extending at right angles to the strut 12**,
- a second arm 16, fixed rigidly to another end **12*b* of the strut 12 and extending at right angles to the strut 12, in a same plane as the plane defined by the first arm 14 and the strut 12, but in a direction opposite to the first arm 14**.

These different elements (the strut 12, the first and second arms 14, 16) are fixed rigidly to one another, in other words, no possibility of movement exists between these elements.

The first arm 14 comprises an anchoring element, fixed rigidly, situated at a predetermined distance from the strut 12. This distance can in particular be chosen as a function of the length of the first arm 14 and of the strut 12. In the embodiment represented, a single anchoring element 18 is provided at the free end **14*a* of the first arm 14. It takes the form of a tab pierced with an orifice 19 for the attachment of a fixing element, for example of snap-hook type, or for the passage of a cordage. This anchoring element 18 is inclined toward the bottom end 12***b* of the strut.

The second arm 16 is for its part provided with two pulleys 20, 22 whose axis of rotation is at right angles to the plane defined by the strut 12 and the first and second arms 14, 16. A first pulley 20 is situated at an end 16*a* of the second arm 16, here the end 16*a* fixed to the strut 12, and a second pulley 22 is situated in proximity to the other end 16*b* of the second arm.

The anchoring element 18 and the pulleys 20 and 22 are arranged so as to allow the passage of a cordage from the anchoring element 18 to the pulleys 20, 22 without interfering with the strut 12 and the first and second arms 14, 16. To this end, as an example, as represented here, one pulley 20 can be situated in the extension of the second arm 16, at the end of the strut 12, the other pulley 22 can be arranged below the second arm 16, at the end thereof. This pulley 22 can be fixed to the second arm 16 by means of a fixing tab 23.

The invention is not limited to a particular arrangement of the pulleys and of the anchoring element, or to a particular number of these elements. The positioning of the pulleys and of the anchoring element could be different, in particular the pulleys could occupy positions more distant from the strut and the second arm and the anchoring element could be at a distance from the strut, but not at the end of the first arm 14. Other anchoring elements and/or pulleys could also be provided, depending on the needs.

Depending on the length of the second arm 16, the pulley 22 can also be arranged at a predetermined distance from the strut 12, for example at a sufficient distance to be inside the enclosure and sufficiently far away from the inner walls of the enclosure in order to avoid friction between the cordage and these walls. It will be noted that the length of the second arm is then sufficient for its free end to be able to be arranged inside different types of enclosure and to allow a positioning of the pulley 22 as specified previously. The length of the first arm will be chosen as a function of the length of the strut in order to allow an attachment of a cordage to the anchoring element and to the pulleys, without interferences with the access device 10.

The strut 12 also has at least one fixing member intended to cooperate with an opening of the confined space.

In the embodiment represented, two fixing members 24, 26 are arranged on either side of the strut 12. They extend on the side of the second arm 16 in a plane at right angles to the plane defined by the strut 12 and the first and second arms 14, 16.

These fixing members 24, 26 define orifices 25, 27 respectively, of axis parallel to the second arm 16. These orifices 25, 27 each have an elongate and curved form, the inward curvature of which is directed toward the end 12*b* of the strut secured to the second arm. In particular, the center of curvature is on a straight line extending substantially in the extension of the strut 12, under the latter. Thus, the two orifices 25, 27 follow substantially one and the same curve, the curvature of which can correspond to the curvature of a lip of a manhole. These orifices are fairly large, which makes it possible to place them easily in line with pre-existing orifices on different manhole lips.

The fixing members 24, 26 are, here, similar to fixing rings. It will be noted that they are situated in immediate proximity to the second arm 16 in the example represented.

The strut 12 has a fixing orifice 28 situated between the fixing members 24, 26 and whose axis is parallel to the second arm 16. It will be noted that this orifice 28 is, here, of oblong form whose length extends substantially parallel to the axis of the strut 12. This orifice 28 also forms a fixing member within the meaning of the invention.

The access device 10 according to the invention can be produced in a single piece, or in several elements secured definitively to one another. The access device is then not dismantable. Advantageously, and as represented in the figures, the access device 10 according to the invention can be produced in several parts, preferably in two parts as in the example represented.

Here, the strut 12 is thus formed in two parts, 121, 122 whose ends are joined and secured by removable fixing elements. A robust strut 12 is thus obtained despite its two-part construction.

In the example represented and as can be seen in particular in FIGS. 1 and 2, a first joined end here forming all of the first part 121 of the strut 12 defines a U-shaped housing whose concavity is open in a direction opposite to the second arm 16. In other words, the bottom wall 123 of this U-shaped housing is arranged on the side of the second arm 16 between the fixing members 24, 26. This bottom wall 123 extends in the longitudinal direction of the strut.

A second joined end 124, which forms part of the second part 122 of the strut 12, is received inside the U-shaped housing, bearing against surfaces internal to this housing. In other words, this second end 124 has a form complementary to the U-shaped housing.

It will be noted that the second end 124 comprises a fixing tab 125 pierced with an orifice 126. This fixing tab comes to bear against the bottom wall 123 of the first part 121 when the two parts 121, 122 are joined one inside the other. The orifice 28 of the bottom wall 123 can then line up with the orifice 126 of the fixing tab 125. It is thus possible to fix the fixing tab 125 to the bottom wall 123 by means of a removable fixing element, such as, for example, a screw-nut set which will be described later.

As mentioned above, the two parts 121, 122, of the strut 12 are secured by removable fixing elements. In the example, these fixing elements are two pins 30, 32, or shafts, which extend parallel to one another and at right angles to the plane defined by the strut 12 and the first and second arms 14, 16. Here, these pins are arranged one above the other and pass through orifices provided for this purpose in the first and second joined parts 121, 122 of the strut, these orifices being aligned for the passage of the pins 30, 32. These pins can be linked by a chain or the like to the strut 12 in order to prevent them from being lost. Furthermore, a screw-nut set comprising a screw 34 makes it possible to associate the first and second parts 121, 122 via the orifices 28, 126 described above, in a direction parallel to the longitudinal direction of the second arm 16.

In the example represented, the second arm 16 comprises two anchoring elements, 36, 38, situated at a distance from the strut 12, here level with the pulley 22, namely at the free end of the second arm 16. They are secured to the tab 23 supporting the pulley 22.

In the present invention, the different anchoring points, 18, 36, 38 are preferably produced in such a way as to observe the safety standards in force for people, such as class B of the standard EN795:2012.

In order to lighten to the maximum weight of the access device 10, the second arm 16 takes the form of an extrusion with H-shaped cross section. The first arm 14, and the top part 122 of the strut 12, are hollow extrusions with closed section.

Figure 3:
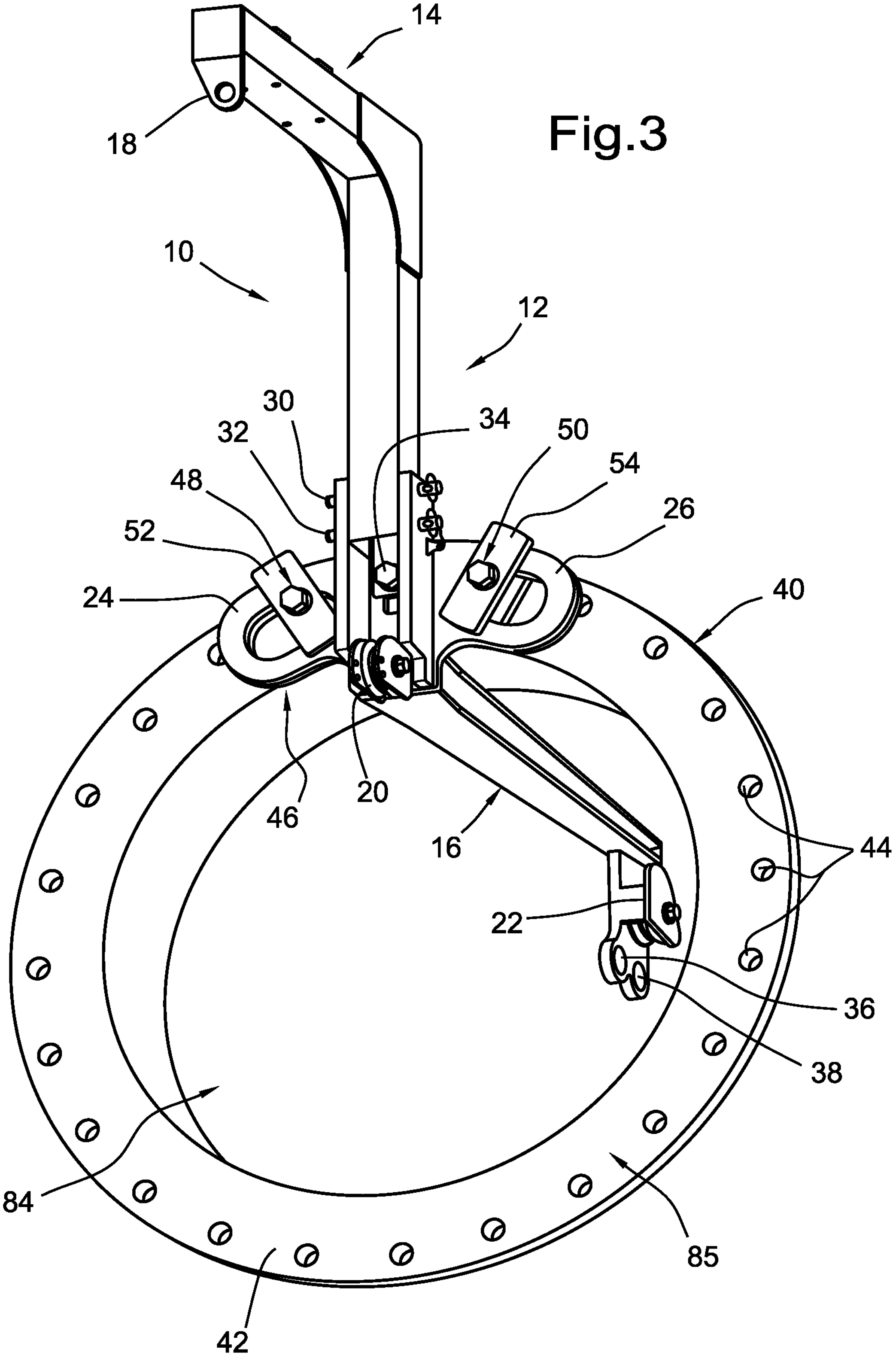
FIG. 3 represents the same access device fixed to an outer lip of the manhole, the latter being partially represented.

FIG. 3 represents the access device 10 described above fixed onto a manhole 85 of an enclosure (not represented in FIG. 3). The same access device 10 is represented schematically in different configurations of use in FIGS. 4-7.

FIG. 3 shows in particular an outer lip 40 of the manhole 85 which usually extends at a distance from the lateral wall 82 of an enclosure 80 (see FIGS. 4-7). This outer lip 40 defines a bearing surface 42 pierced with orifices 44. It will be noted that these orifices 44 are distributed over all the periphery of the outer lip 40, here of annular form. These orifices 44 are initially intended to ensure the closure of the manhole 85 by a plate screwed by screws passing through these orifices 44. In order to ensure a good closure of the manhole, the bearing surface 42 is therefore generally planar and extends over all the perimeter of the manhole 85.

When it is fixed to the manhole 85, the strut 12 of the access device 10 extends vertically (or substantially vertically), above the manhole. The first arm 14 extends substantially at right angles to the lateral wall 82 of the enclosure, whereas the second arm 16 extends inside the manhole, substantially parallel to the axis thereof. This second arm 16 is bearing against a top inner surface 46 of the outer lip 40. The fixing members 24, 26 are bearing against the bearing surface 42 of the outer lip. Here, the securing of the access device 10 is obtained by two fixing screws 48, 50 by means of tightening nuts (not represented), these screws being inserted through orifices 25, 27 of fixing the members and orifices 44 of the outer lip 40 that are lined up. It will be noted that, by virtue of the relatively large dimensions of the orifices 25, 27, the heads 49, 51 of the screws 48, 50 respectively cannot be retained by the fixing members. To nevertheless allow for a securing of the screws 48, 50, pierced backing plates 52, 54 are interposed between the screwheads 49, 51 and the fixing members 24, 26, the screws 48, 50 passing through these plates 52, 54 whose dimensions are large enough to bear against the edges of the orifices 25, 27. Other pierced plates 56, 58 are arranged bearing against a face of the outer lip 40 opposite the bearing surface 42 receiving the fixing rings, between the lip 40 and tightening nuts (not represented). These plates 56, 58, also passed through by the screws 48, 50, make it possible to ensure a better engagement and a better tightening of the screw-nut sets. Note that the tightening nuts can be incorporated in these plates 56, 58 for easier manipulation.

Other pierced plates 60, 62 are provided to ensure the tightening of the screw 34 passing through the orifices 126, 28. This screw 34 is thus also used for the fixing of the access device 10 onto the outer lip 40 by passage through one of the aligned orifices 44.

The fixing of the access device 10 described previously to the manhole 85 is now detailed.

The bottom part of the access device 10, namely the second arm 16 and the part 121 of the strut 12, is first of all fixed onto the manhole 85. To this end, the fixing members 24, 26 are placed bearing against the bearing surface 42 of the outer lip 40, the part 121 of the strut extending substantially vertically above the manhole 85, the second arm 16 is, for its part, pressed along the top inner wall 46 of the manhole 85.

After this bearing placement, the orifices 25, 27 of the fixing members and the orifice 28 can be lined up with the orifices 44 of the outer lip. It is then possible to insert the fixing screws 48, 50 mounted on the backing plates 52, 54. On the other side of the outer lip, the backing plates 56, 58 are threaded onto the screws 48, 50, then the tightening nuts are put in place. The bottom part of the access device is then fixed to the manhole. It is then possible to put in place the top part, by joining the end 124 inside the end 121. The fixing screw 34 is then inserted into the aligned orifices 126, 28 and 44 and its nut is put in place. It is thus possible to rapidly secure, notably in less than five minutes, the access device to the outer lip by means of three screw-nut sets.

Note that the invention is not limited to a particular number of removable fixing elements, or to their form, provided that they make it possible to rigidly and non-definitively fix the access device to the manhole, and the different parts of the strut as appropriate.

A few configurations of use of the access device are described hereinbelow.

Figure 4:
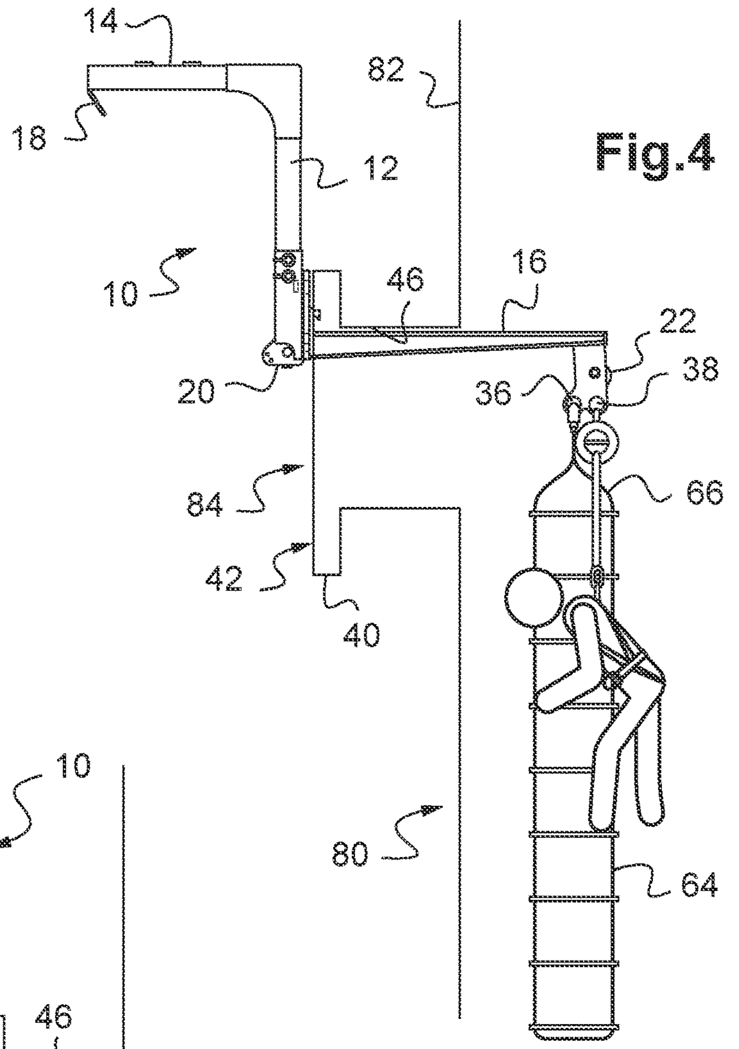
FIGS. 4, 5, 6, 7 are schematic representations of the device according to the invention in different configurations of use.

FIG. 4 represents a configuration in which a ladder 64 is fixed to one of the anchoring points 36, 38 of the device situated inside the enclosure. The other anchoring element 38 is used here to secure the lowering of a worker by means of a fall prevention device 66 to which the worker is attached by means of a harness.

Figure 5:
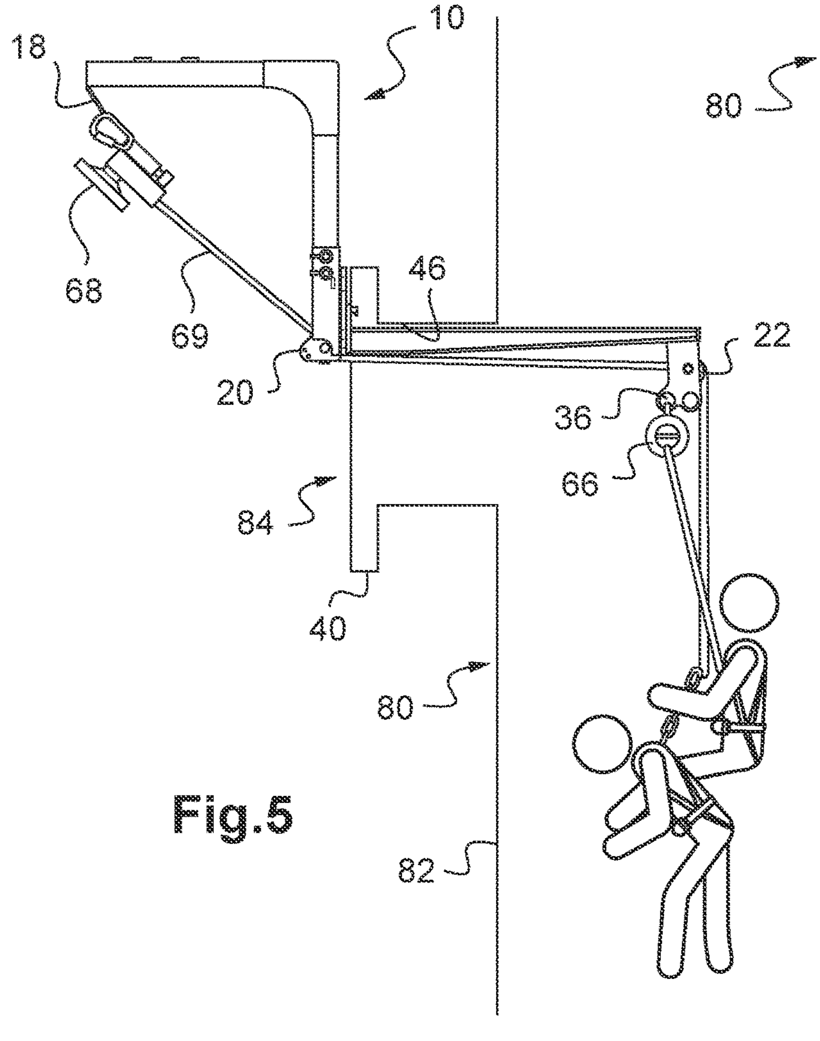

FIG. 5 represents a rescue configuration. The outer anchoring element 18 is used here to fix a raising device 68 whose cordage 69 passes through the pulleys 20, 22 to the victim to be raised. The rescuer is, for his part, attached by a harness to a fall prevention device 66 attached to the anchoring element 36. It is thus possible to raise a person, even an unconscious person, via the access device according to the invention.

Figure 6:
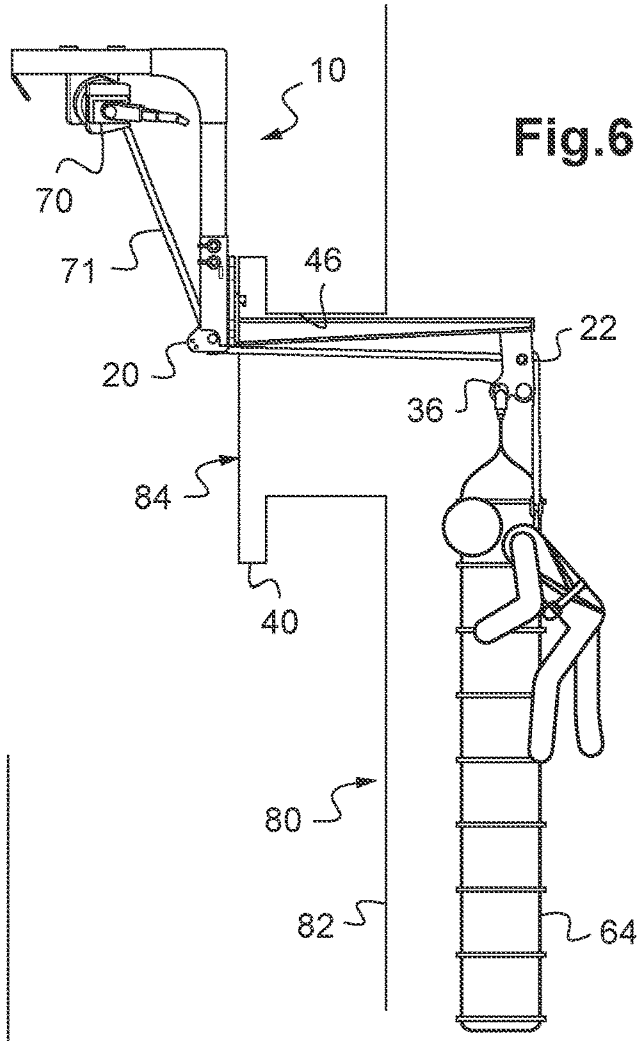

In the configuration of FIG. 6, a winch 70 is fixed to the outside of the enclosure 80 on the first arm 14 of the access device 10. A cordage 71 passing through the pulleys 20, 22 links the worker to the winch. A ladder 64 is fixed inside the enclosure to the anchoring element 36 to facilitate the descent.

Figure 7:
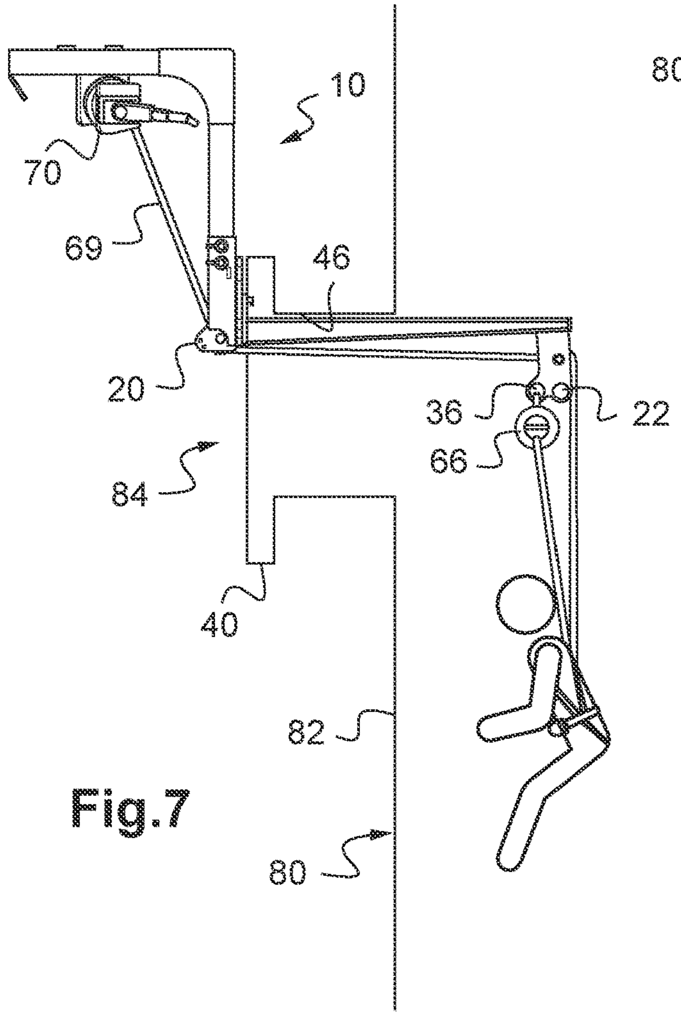

In the configuration of FIG. 7, a fall prevention device 66 is attached to the anchoring element 36. A winch 70 is fixed in the same way as in the configuration of FIG. 6 and is used to raise or lower a person.

The access device according to the invention thus allows for safe access to a confined space, for maintenance interventions, the different anchoring elements making it possible to ensure the safety of a worker and/or to attach working equipment, or for rescue interventions, the different anchoring elements being able to be used to attach lowering/raising devices.

Furthermore, the access device has little bulk and its weight can be of the order of 30 to 35 kg when the different parts are made of steel.

Obviously, other materials can be envisaged, such as aluminum or other alloys.

The invention claimed is:

1. An access device for safe access to a confined space, comprising:
   - a rectilinear support strut,
   - a first arm fixed rigidly to an end of the strut and extending at right angles to the strut,
   - a second arm fixed rigidly to another end of the strut and extending at right angles to the strut, in a same plane as the plane defined by the first arm and the strut but in a direction opposite to the first arm,
   - and in which:
     - the first arm comprises at least one anchoring element situated at a predetermined distance from the strut,
     - the second arm is provided with a first pulley and a second pulley whose axis of rotation is at right angles to the plane defined by the strut and the first and second arms, the first pulley being situated at an end of the second arm fixed to the strut and the second pulley being situated at a predetermined distance from the strut, the anchoring element and the first and second pulleys being arranged so as to allow the passage of a cordage to the first and second pulleys without interfering with the strut and the first and second arms, the strut has at least one fixing member adapted to cooperate with an opening of the confined space, the strut is formed in two parts whose ends are joined and secured by removal fixing elements, and a first joined end defines a U-shaped housing whose concavity is open in a direction opposite to the second arm and a second joined end is received inside the housing, bearing against surfaces internal to the housing.

2. The access device according to claim 1, characterized in that the at least on fixing member comprises two fixing members extending in a plane at right angles to the plane defined by the strut and the first and second arms, on either side of the strut.

3. The access device according to claim 1, characterized in that the at least one fixing member defines an orifice of axis parallel to the second arm, the orifice having an elongate form.

4. The access device according to claim 1, characterized in that the second joined end comprises a pierced fixing tab cooperating with an orifice formed in a bottom wall of the U-shaped housing of the first end, a pin passing through corresponding orifices of the joined ends or a screw joining the fixing tab to the bottom wall of the housing.

5. The access device according to claim 1, characterized in that the second arm is an extrusion with H-shaped cross section.

6. The access device according to claim 1, characterized in that the second arm comprises at least one anchoring element situated at a predetermined distance from the strut.

7. An enclosure comprising;

a lateral wall provided with a manhole having a perimeter, the perimeter having an outer lip at a distance from the lateral wall, an access device secured to the manhole, the access device having:

a rectilinear support strut, a first arm fixed rigidly to an end of the strut and extending at right angles to the strut, a second arm fixed rigidly to another end of the strut and extending at right angles to the strut, in a same plane as the plane defined by the first arm and the strut but in a direction opposite to the first arm, and in which:

the first arm comprises at least one anchoring element situated at a predetermined distance from the strut, the second arm is provided with a first pulley and a second pulley whose axis of rotation is at right angles to the plane defined by the strut and the first and second arms, the first pulley being situated at an end of the second arm fixed to the strut and the second pulley being situated at a predetermined distance from the strut, the anchoring element and the first and second pulleys being arranged so as to allow the passage of a cordage to the first and second pulleys without interfering with the strut and the first and second arms, the strut has at least one fixing member adapted to cooperate with an opening of the confined space the strut of the access device extends substantially vertically above the manhole, the first arm extending substantially at right angles to the lateral wall of the enclosure and the second arm extending inside the manhole, bearing against a top inner surface of the manhole, wherein the at least one fixing member of the access device is bearing against the outer lip and secured thereto.

8. A method for installing an access device on a manhole formed through a lateral wall of an enclosure, the manhole having, on its perimeter, an outer lip, the method comprising the following steps:

providing an access device, the access device comprising:

a rectilinear support strut, a first arm fixed rigidly to an end of the strut and extending at right angles to the strut, a second arm fixed rigidly to another end of the strut and extending at right angles to the strut, in a same plane as the plane defined by the first arm and the strut but in a direction opposite to the first arm, and in which:

the first arm comprises at least one anchoring element situated at a predetermined distance from the strut, the second arm is provided with a first pulley and a second pulley whose axis of rotation is at right angles to the plane defined by the strut and the first and second arms, the first pulley being situated at an end of the second arm fixed to the strut and the second pulley being situated at a predetermined distance from the strut, the anchoring element and the first and second pulleys being arranged so as to allow the passage of a cordage to the first and second pulleys without interfering with the strut and the first and second arms, the strut has at least one fixing member adapted to cooperate with an opening of the confined space placing at least one fixing member of the access device bearing against the outer lip, the strut extending substantially vertically above the manhole, the first arm extending substantially at right angles to the lateral wall of the enclosure and the second arm extending inside the manhole, bearing against a top inner surface of the manhole, securing of at least one fixing member to the outer lip.

* * * * *